United States Patent
Miché

Patent Number: 5,742,235
Date of Patent: Apr. 21, 1998

[54] VERTICAL, UNIDIRECTIONAL SEISMIC SWITCH

[76] Inventor: John Andrew Miché, 1405 S. 58th St., Richmond, Calif. 94804

[21] Appl. No.: 505,705

[22] Filed: Jul. 21, 1995

[51] Int. Cl.$^6$ ...................................... G08B 21/00
[52] U.S. Cl. ............ 340/690; 200/61.49; 200/DIG. 8; 200/DIG. 20; 307/117; 340/540; 340/601; 340/669
[58] Field of Search ...................... 340/690, 669, 340/601, 540; 200/61.49, 61.51, DIG. 8, DIG. 20; 307/117

[56] References Cited

U.S. PATENT DOCUMENTS

| | | | |
|---|---|---|---|
| 4,066,992 | 1/1978 | Buller et al. | 340/690 |
| 4,189,945 | 2/1980 | Whiting | 73/652 |
| 4,212,208 | 7/1980 | Weale et al. | 73/652 |
| 4,214,238 | 7/1980 | Adams et al. | 340/690 |
| 4,262,289 | 4/1981 | Rivera | 340/690 |
| 4,300,135 | 11/1981 | Kora et al. | 340/690 |
| 4,408,196 | 10/1983 | Freeman | 340/690 |
| 4,414,994 | 11/1983 | Hogan | 200/61.47 |
| 4,484,186 | 11/1984 | Wood et al. | 340/689 |
| 4,528,559 | 7/1985 | Freeman | 200/DIG. 8 |
| 4,616,320 | 10/1986 | Kerr et al. | 364/421 |
| 4,764,761 | 8/1988 | Maguire | 340/690 |
| 4,764,762 | 8/1988 | Almour | 340/690 |
| 4,789,922 | 12/1988 | Cheshire | 362/158 |
| 4,833,461 | 5/1989 | Yeager | 340/690 |
| 4,841,287 | 6/1989 | Flig et al. | 340/690 |
| 4,841,288 | 6/1989 | Addicks | 200/61.49 |
| 4,945,347 | 7/1990 | Perry | 340/689 |
| 5,001,466 | 3/1991 | Orlinsky et al. | 340/690 |
| 5,001,933 | 3/1991 | Brand | 200/61.51 |
| 5,101,195 | 3/1992 | Caillat et al. | 340/690 |
| 5,237,135 | 8/1993 | Wolski | 200/61.45 R |
| 5,278,540 | 1/1994 | Caban-Dowenech | 340/601 |
| 5,379,025 | 1/1995 | Tatom et al. | 340/601 |
| 5,396,223 | 3/1995 | Iwabuchi et al. | 340/690 |
| 5,418,523 | 5/1995 | Anderson et al. | 340/690 |
| 5,420,380 | 5/1995 | Harben et al. | 181/122 |

*Primary Examiner*—Glen Swann

[57] ABSTRACT

A switch including a mass suspended above a base by a flat horizontal spring has electric contacts that close in response to the initial shocks of major earthquakes and activates safety devices before the onset of destructive ground motions. The vertical unidirectional seismic switch can be manufactured by micromechanical photolithography and is integrated with electromechanical safety devices to latch cabinets closed, secure movable objects, shut off gas, water, and electric utilities, activate alarms, early warning networks, and related automated response systems. The device is fully self contained, consumes no power until activated, is inexpensive to produce, and impervious to nonearthquake noise in that it is designed to respond specifically to the vertical acceleration and displacement characteristic of the initial shock waves of a major earthquake.

12 Claims, 5 Drawing Sheets

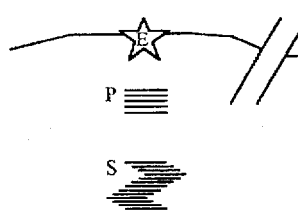
Figure 1a
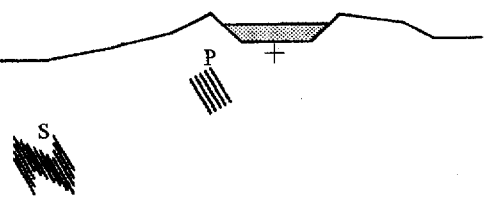
Figure 1b
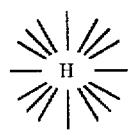
Figure 2
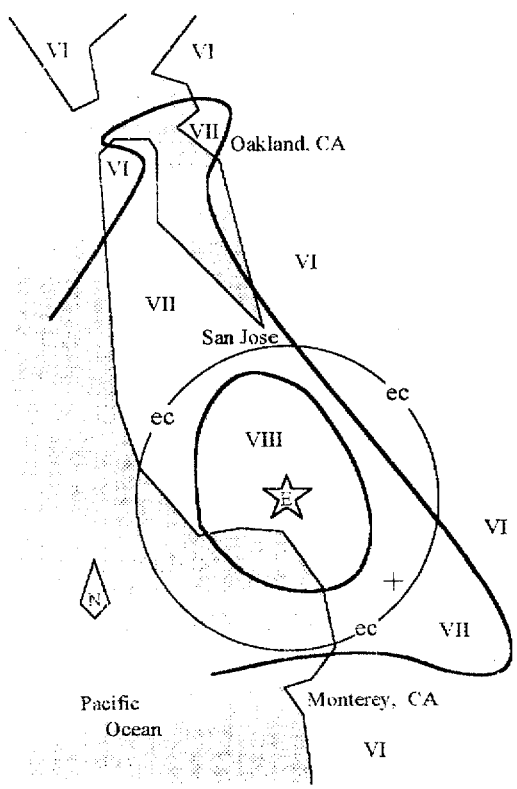
Figure 3
Figure 4
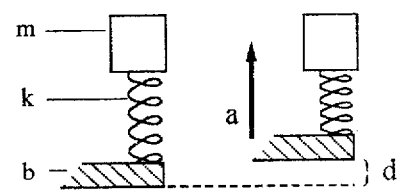

*Figure 9a*  *Figure 9a'*
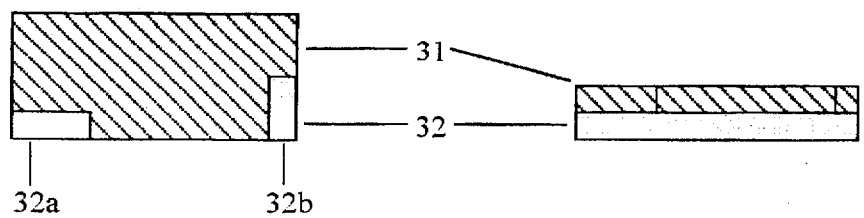
*Figure 9b*  *Figure 9b'*
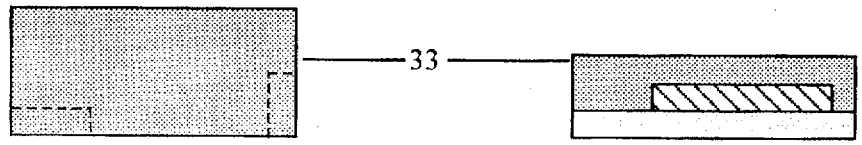
*Figure 9c*  *Figure 9c'*
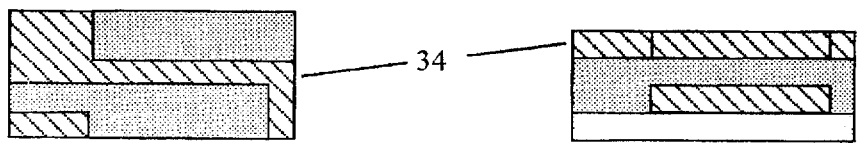
*Figure 9d*  *Figure 9d'*
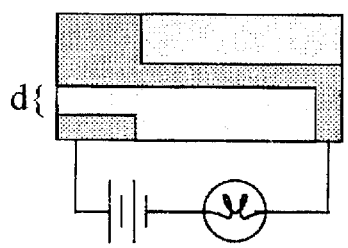 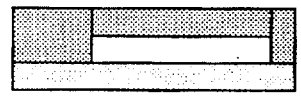
*Figure 10*
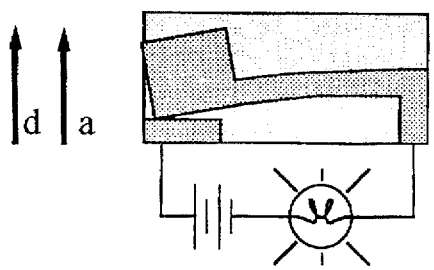

VERTICAL, UNIDIRECTIONAL SEISMIC SWITCH

FIELD OF INVENTION

This invention relates to an electric switch which detects the initial shocks of major earthquakes and activates safety devices before the onset of destructive ground motions.

BACKGROUND

Major earthquakes are known to cause buildings to collapse, dishevel roads, shear pipe lines, disrupt communication, set fires, and inflict injuries which sometimes result in death. While significant advances have been made to reinforce structures against earthquakes, little has been done to reduce nonstructural hazards. Toppled furniture, objects thrown off shelves and out of cabinets, broken gas and water lines, damaged electric power lines and equipment, derailed passenger trains and elevators, and catastrophic disruption of industrial processes continue to pose a hazard to people and property during a major earthquake. Injuries aside, serious economic losses result from major earthquakes due to the cost of emergency services, repairs, and clean-up.

In this regard, a reliable apparatus to detect major earthquakes and activate safety devices would be of benefit. One which initiates safety measures before the onset of the earthquake's most destructive ground motions, even more so. A forewarning of a few seconds would be most beneficial by warning people to take cover, latching cabinets closed, deactivating electrical equipment, systematically shutting down pipelines, stopping passenger elevators and trains, and putting industrial plants such as refineries and electric power plants on standby so as to safely ride out the earthquake, thereby minimizing damage to persons and property.

Seismologists know well that the P wave of an earthquake precedes all others. Next the S wave, followed by the most destructive L and R surface waves. This sequence is due to the speed and manner by which the various shock waves propagate. The P wave (Primary, compression, push pull) is the fastest, followed by the S wave (Secondary, shear, side to side), both of which propagate directly through the earth. When these body waves reach the surface they give rise to the more destructive L (Love, long undulations) and R (Rayleigh, Rolling) surface waves. Because the P wave propagates faster, directly through the earth, it typically arrives seconds before the S wave which in turn arrives seconds before more destructive L and R surface waves.

Conveniently, the amplitude of the P wave provides a direct measure of an earthquake's potential destruction. The P waves of major earthquakes are significantly larger than those of small to moderate earthquakes. Combined with the observation that the motion of the P wave in the vicinity of the epicenter is predominantly up and down, results in a distinct precursory measure of the potential destruction to come. One which is available seconds before the onset of the most destructive earthquake waves and easily isolated from nonearthquake seismic noise.

As it turns out the sequence of earthquake shock waves provides a second chance. The S wave which follows closely after the P wave also provides a forewarning of the more destructive L and R surface waves. The S wave has both horizontal and vertical components and like the P wave the amplitude of the vertical component of the S wave provides a direct measure of the potential destruction of an earthquake.

In either case, it is the vertical component of the P and S waves which provide a direct measure of an earthquake's local magnitude seconds before the onset of more intense ground motion. No other source on earth produces the unique vertical threshold accelerations and displacements characteristic of the P and S waves of a major earthquake. Given this knowledge, all that is needed is a device which isolates and measures the initial vertical shocks of a major earthquake and activates safety devices before the onset of its more destructive horizontal ground motions.

PRIOR ART

The intense horizontal motions of a major earthquake are by far the most destructive. In light of this, much effort has been given to design and build structures to withstand these dynamic horizontal loads. Following this line of reasoning a number of patents have been granted for a variety of safety devices such as cabinet latches, emergency lights, audible alarms, gas, liquid and electric shut off devices, which are activated by the intense horizontal motions of a major earthquake. Given the distinctive vertical motions of P and S waves and their arrival seconds before the most destructive ground motions, activating earthquake safety devices by horizontal motions makes little sense.

U.S. Pat. No. 4,262,289 "Seismic Tremor Sensor Alarm" issued Apr. 14, 1981 to Jose D. C. Rivera, describes a unidirectional horizontal threshold seismoscope to detect major earthquakes. Sadly the device claimed is incorrectly oriented, such that it only responds to unidirectional horizontal motions, which renders it ineffective for detecting the P and S waves in the epicentral area of a major earthquake.

U.S. Pat. No. 4,528,559 "Seismic Actuation System" issued Jul. 9, 1985, and U.S. Pat. No. 4,408,196 "Seismic Alarm System" issued Oct. 4, 1983 to Albert I. Freeman, describe an earthquake sensor with a plurality of weighted horizontal motion sensors. The application is noteworthy in that multiple warning devices are claimed including one which produces spoken words. Unfortunately, because the device only responds to horizontal motion, its warning would come right at the onset of the earthquakes most destructive horizontal motions, which is too late to be of any value.

U.S. Pat. No. 4,414,994 "Earthquake Fire Safety System" issued Nov. 15, 1983 to Roderick D. Hogan, describes a unidirectional vertical sensor to detect earthquakes an activate safety devices such as electrical and gas shut off devices. The sensor described uses static friction to counter the normal force of gravity and establish a detection threshold. In practice this type of sensor will initiate false alarms by accumulating small shocks and by responding to higher frequency nonearthquake seismic noises such as road traffic.

U.S. Pat. No. 4,841,288 "Earthquake Illuminating Device" issued Jun. 20, 1989 to Lyle F. Addicks, is also interesting in its use of a unidirectional horizontal motion sensor which, like the above, results in an ineffective detection of the initial shock waves of major earthquakes.

U.S. Pat. No. 5,001,466 "Earthquake Detector" issued Mar. 19, 1991 to Orlinsky and Caillat, and U.S. Pat. No. 5,101,195 "Discriminating Earthquake Detector" issued Mar. 31, 1992 to Caillat and Orlinsky, are noteworthy in their recognition of the precursory nature of the P wave. Unfortunately, both applications failed to recognize the related nature of the S wave and that the vertical motion of the P and S waves are all that is needed. Furthermore, the threshold acceleration of 0.005 g claimed is far too low to be of practical use. Lastly, the electronic sensor and related filter circuitry described are expensive and require continuous power to operate which further limits the practicality of the design.

U.S. Pat. No. 5,001,933 "Micromechanical Vibration Sensor" issued Mar. 26, 1991 to John H. Brand, is of interest in that it describes a vibration sensor made by micromechanical photolithography. The application describes various vibration sensors for machine monitoring to warn against potentially damaging or unsafe operating conditions. No claim is made for earthquake monitoring and the devices described are inadequate for this purpose in that they have insufficient inertial mass to detect the low frequency vibrations (0.05 to 10 Hz) characteristic of major earthquakes.

OBJECTIVES AND ADVANTAGES

The object of this invention is a switch that detects the initial shocks of major earthquakes and activates safety measures before the onset of the most destructive ground motions. A unidirectional vertical threshold seismic switch is integrated with electromechanical means to realize a variety of earthquake safety devices. The Seismic Switch is designed to respond specifically to the upthrust (vertical, unidirectional) accelerations and displacements (threshold) characteristic of the P and S waves (Seismic) within the epicentral region of a major earthquake (Richter 6, Mercalli VIII or greater). The switch reliably detects and measures the initial shock waves of major earthquakes which is crucial to the activation of safety measures before the most destructive ground motions begin.

The foremost advantage of Seismic Switch is the reliability of its measure. The unidirectional nature of the device isolates vertical motions and eliminates activation by horizontal motions. Further tuning the spectral response of the device by adjusting its inertial mass, spring, and damping forces eliminates activation by nonearthquake sources. The combination of these design characteristics result in a detector which responds exclusively to initial shock waves in the epicentral area of a major earthquake.

Once realized the Seismic Switch provides a reliable trigger with which to activate a variety electromechanical earthquake safety devices. Warning people to take cover, latching cabinets closed and objects in place, deactivating electrical equipment, activating emergency lights and alarms, shutting down pipelines, stopping passenger trains and elevators, and putting industrial plants on standby are just some of the many applications which can be realized using the Seismic Switch. Given this disclosure and a little imagination the applications to which the Seismic Switch can be applied are limitless.

BRIEF DESCRIPTION OF DRAWINGS

FIGS. 1a & b A graphic representation of a major earthquake and associated shock waves.

FIG. 2 A three axis seismogram of the Loma Prieta Earthquake recorded Oct. 18, 1989.

FIG. 3 An isoseismal map of the Loma Prieta Earthquake

FIG. 4 A simple vertical seismoscope

FIGS. 9a through d' A process schematic for the manufacture of a Seismic Switch using photolithography.

FIGS. 10 A side view of the Seismic Switch made by photolithography which has been activated by the initial shocks of a major earthquake.

DESCRIPTION OF PREFERRED EMBODIMENT

Figure 5A:
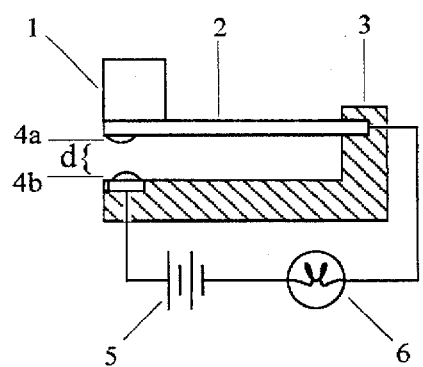
FIGS. 5a, b, c & d Side views of the Seismic Switch operation

FIGS. 1a & b provide a graphic representation of a major earthquake. The P and S waves are generated simultaneously at the hypocenter H of the earthquake and propagate outward in all directions through the body of the earth.

FIG. 1a shows the epicentral region seconds after the onset of a major earthquake and seconds before the P and S waves reach the earth's surface at the epicenter E. The P waves are by nature faster and race ahead of the S waves to arrive ahead of all wave fronts everywhere distant from the hypocenter. Within this epicentral region the P wave motion is up and down and the S wave motion is side to side.

FIG. 1b is a time frame seconds after FIG. 1a and shows an area some distance from the epicenter. The P and S waves have given rise to the L and R waves which propagate outward in all directions from the epicenter on the surface of the earth. At this distance from the hypocenter the time difference between the P and S waves is more pronounced and both arrive everywhere ahead of the more destructive L and R surface waves. As the distance from the epicenter increases, the angle of incidence of the P and S waves with the surface decreases as a function of the distance from the epicenter. Accordingly, the vertical component of the P wave motion decreases, while that of the S wave increases. Clearly, isolating the vertical accelerations and displacements of the initial shock waves of an earthquake is all that is needed to measure its potential destruction.

FIG. 2 is a three axis seismogram of the Loma Prieta Earthquake which occurred near Santa Cruz, Calif. at 5:04 pm on Oct. 18th 1989. The recordings were made by strong motion seismometers + located 46 km Southeast of the epicenter E at the foot of the San Justo Dam near Hollister, Calif. The top graph NE is a recording of the horizontal seismometer oriented Northwest by Southeast. The middle graph UP is a recording of the vertical seismometer. The bottom graph SW is a recording of the horizontal seismometer oriented Southwest by Northeast.

The seismographs clearly show the vertical ground accelerations and displacements characteristic of the P and S waves arrived several seconds before more severe ground motions indicated by the horizontal components. The initial shock of the P wave activates the recorder and builds in intensity exceeding the critical threshold displacement d at time tP. Next the S wave begins and immediately exceeds the vertical threshold d at time tS. This sequence of ground motions is typical of a major earthquake and shows that the vertical motion of the P and S waves exceeded the threshold displacement several seconds before the onset of the more destructive ground motions of the L and R waves at times tL and tR respectively.

FIG. 3 is an isoseismal map of Loma Prieta Earthquake. Mercalli scale intensity VIII was observed within the epicentral region to a distance of 30 km of the earthquake's epicenter. Mercalli VII intensity was observed up to 100 km from the epicenter, running in a Northwest to Southeast direction. Mercalli intensity VI and less was observed outside of these contours.

The circle ec encompasses the area within 50 km of the epicenter of the Loma Prieta earthquake. Within this epicentral area 18 strong motion seismometers recorded the threshold vertical acceleration and displacement characteristic of the P and S waves of a major earthquake. All 18 stations recorded the threshold displacement 2 seconds or more before the onset of destructive ground motions. Clearly the vertical accelerations associated with the P and S waves of an earthquake provide a reliable measure of its local magnitude.

FIG. 4 shows a simple vertical seismoscope comprised of a mass m on a spring k mounted on a base b. At rest the weight of the mass is in equilibrium with the force of the spring. An upward acceleration of the assembly results in a downward force on the spring due to the inertia of the mass. When properly assembled the displacement d corresponds to the acceleration and displacement experienced by the system.

FIGS. 5a, b, c & d are side views showing the operation of the Seismic Switch. All embodiments claimed for this invention are extensions of this basic apparatus.

FIG. 5a is a side view of the Seismic Switch in its normally open state. A mass 1 is suspended on the end of a flat spring 2 mounted on a base 3 which is fastened to elements of, or objects within a structure in contact with the earth. In this configuration the motion of the mass is decoupled from that of the base. When the base experiences the upward accelerations and displacements characteristic of the initial shock waves of a major earthquake the inertia of the mass exerts a relative downward force on the spring closing the contacts 4a and 4b allowing current to flow from the Battery 5 through the light 6. The spectral response of the assembly can be readily tuned to any desired acceleration and displacement thresholds by adjusting the inertial mass, spring and damping forces of the assembly and the distance between the contacts.

Figure 5B:
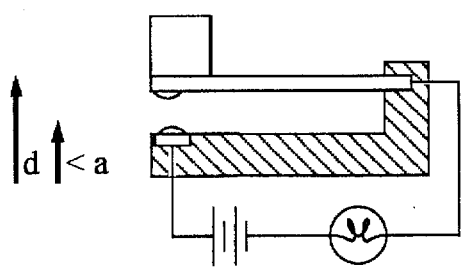

FIG. 5b shows the Seismic Switch subjected to a vertical displacement d and small acceleration <a characteristic of low frequency surface waves outside the epicentral area of a major earthquake. Here the force imparted by the acceleration is small compared to that of the spring which flexes slightly in response. The overall response of the assembly is such that the mass and base move in tandem and the contacts never close.

Figure 5C:
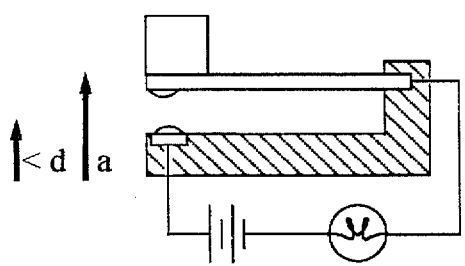

FIG. 5c shows the Seismic Switch subjected to a small displacement <d and acceleration a characteristic of high frequency waves generated by nonearthquake sources. While the force imparted by the acceleration is sufficient to overcome that of the spring the displacement is too small to close the contacts. The mass vibrates on the end of spring, but the contacts never close.

Figure 5D:
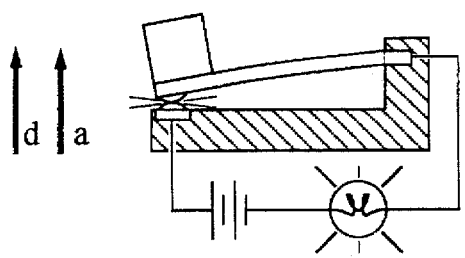

FIG. 5d shows the Seismic Switch subjected to a vertical displacement d and acceleration a characteristic of the initial shock waves of a major earthquake. The inertia of the switch mass overcomes the spring force and the displacement is large enough to close the contacts momentarily allowing current to flow from the battery through the light.

Figure 6A:
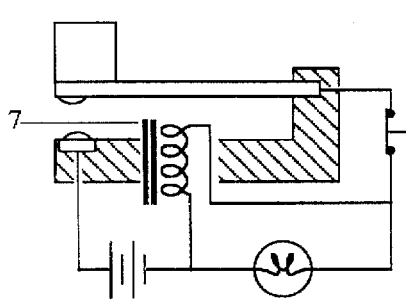
FIGS. 6a & b Side views of the Seismic Switch with latching relay

FIGS. 6a & b are side views showing the operation of the Seismic Switch with a latching coil 7 and a normally closed momentarily open reset switch 8.

FIG. 6a shows the Seismic Switch in its normally open state The contacts are open and no current flows in the attached circuit.

Figure 6B:
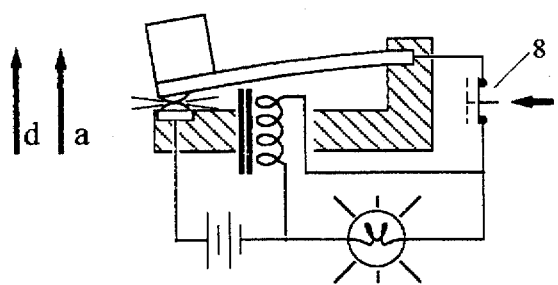

FIG. 6b shows the Seismic Switch after it has been activated by the initial shock waves of a major earthquake. Once the contacts close, current flows through the coil which generates a magnetic field latching the contacts closed. The Seismic Switch stays on until reset by interrupting the flow of current through the latching coil using the reset switch.

Figure 7:
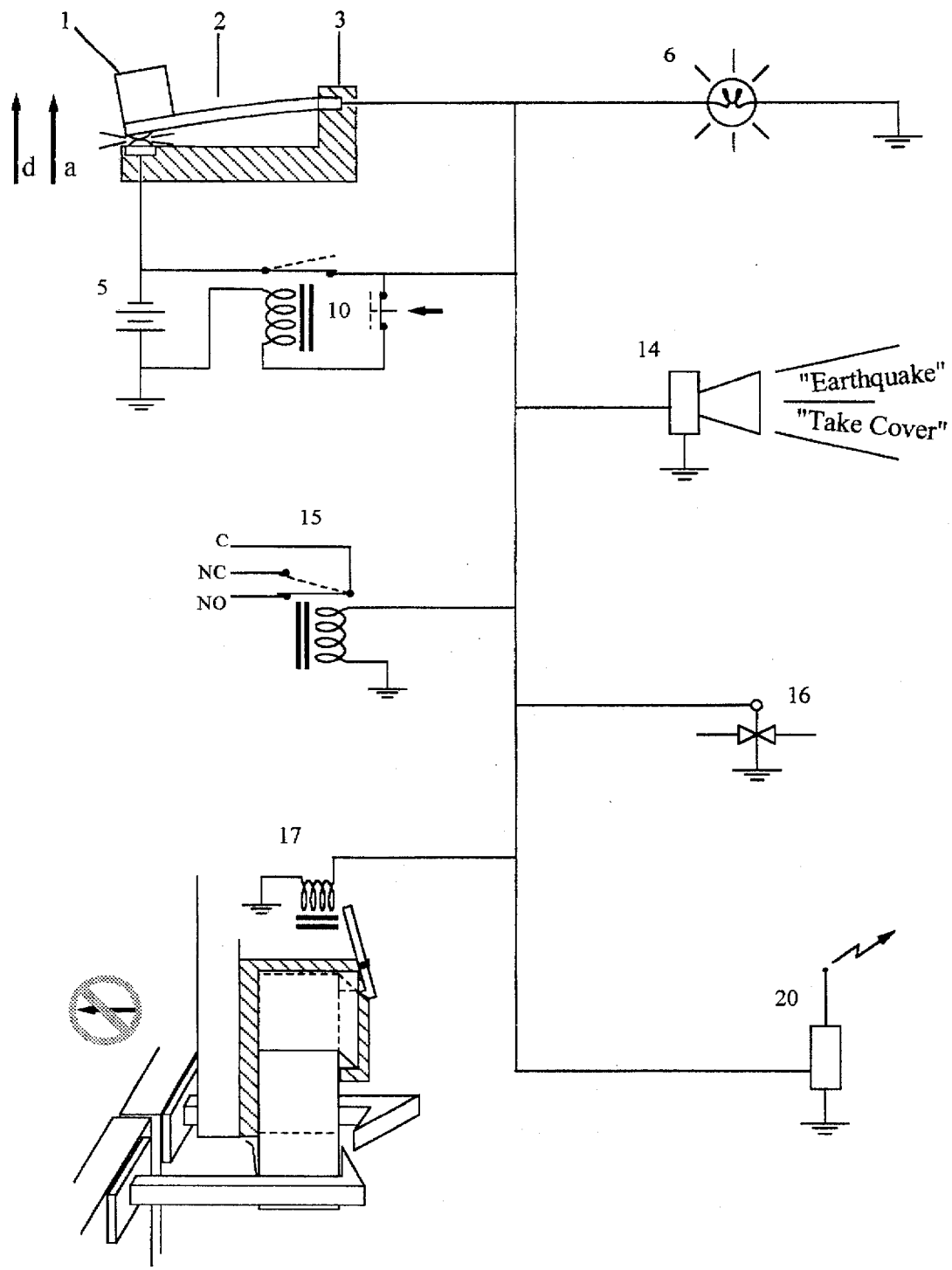
FIG. 7 A schematic diagram of the Seismic Switch used to activate electromechanical devices.

FIG. 7 is a schematic diagram of an Seismic Switch with electric contacts connected to various electromechanical earthquake safety devices. A Battery 5 is shown, but obviously any suitable power source would work as well. As in FIG. 5d the lamp 6 lights when the Seismic Switch is activated by the initial shock waves of a major earthquake. Similarly, all of the safety devices connected to the circuit will be activated as well.

A latching relay and reset switch 10 are shown connected to the Seismic Switch. Once activated by the Seismic Switch the relay latches closed and maintains the current in the circuit for those devices which require continuous power to operate. A normally closed momentary open switch in the latching relay circuit is used to reset the circuit by interrupting the current to the latching relay, deactivating it and any devices connected to it.

An audible alarm 14 uses a solid-state recording device to store a verbal message which warns people to take cover before the onset of the earthquake's most destructive ground motions. The recording can also store verbal instructions for use after the earthquake subsides, reminding people to check for gas leaks and structural damage, provide first aid, recall phone numbers, and how to reset any devices connected to the Seismic Switch.

An electric relay 15 can shut down electrical equipment, activate other electromechanical safety devices, and initiate automated safety systems. Stopping passenger trains, putting automated industrial processes, such as chemical refineries and the like, in a safe standby mode, and stopping elevators at the nearest floor and opening the doors to let passengers out, are just some of the many automatic safety operations made possible by the Seismic Switch.

An electromechanical shut off valve 16 shuts off gas and liquid supplies. Multiple shut off valves in a piping system would allow for the isolation of broken sections, minimizing material loss and allowing limited operation immediately after the earthquake.

An electromechanical latch 17 latches cabinet doors and drawers closed, keeping the contents from spilling out during the earthquake. Similar electromechanical latch mechanisms can be applied to secure large and small movable objects during a major earthquake.

A radio transmitter 20 activates early warning networks at remote locations, increasing the advance warning to remote locations by several seconds. This would provide additional time to stop passenger trains, put industrial processes on standby, isolate pipeline supply networks, and evacuate elevators at the nearest floor.

Figure 8:
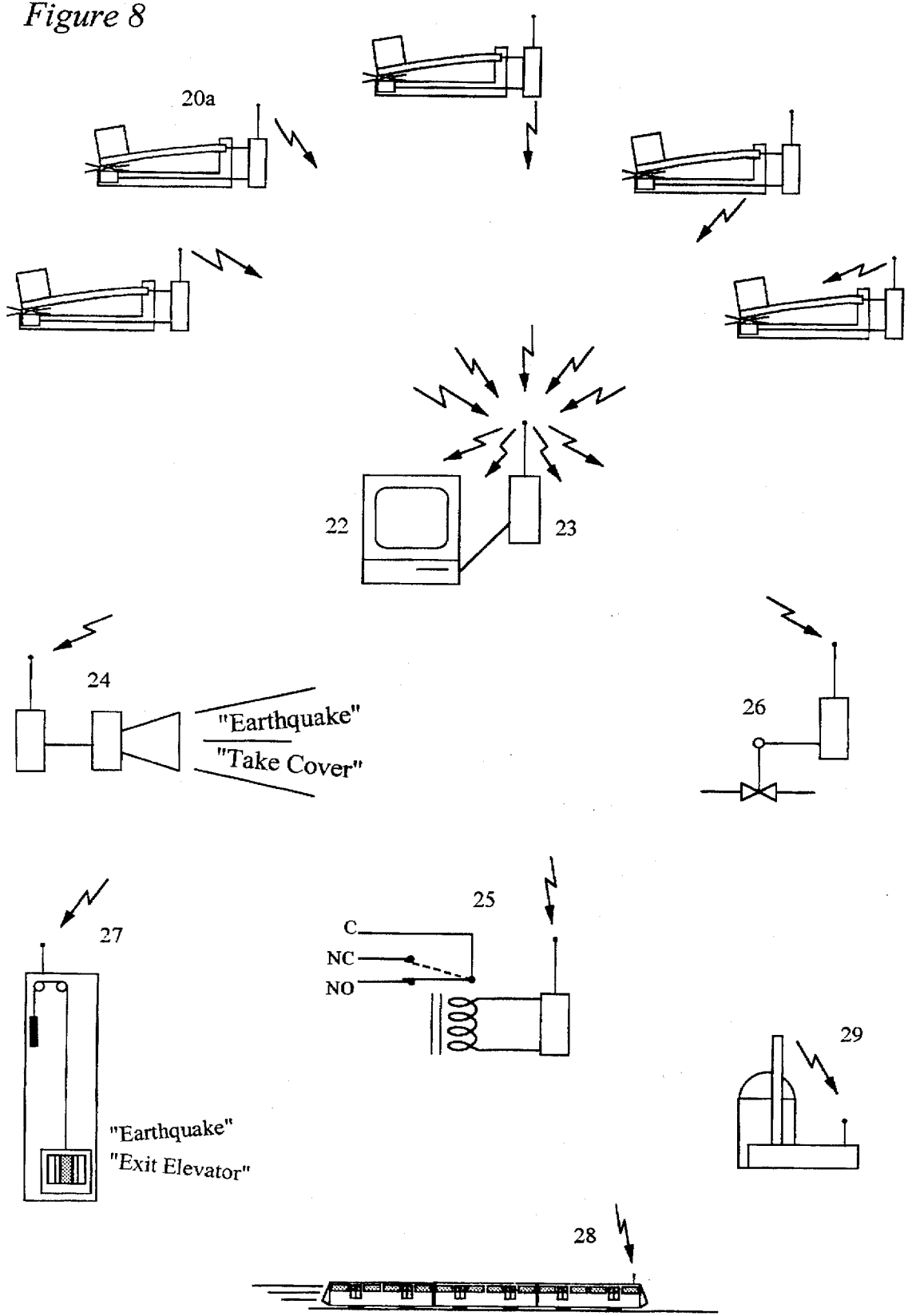
FIG. 8 A graphic representation of an early warning network.

FIG. 8 shows a Seismic-Switch-activated-transmitters 20a and a computer 22 connected to a transceiver 23 such as those used in cellular phone networks. The computer records and analyzes the activation time and location of the various transmissions received through the transceiver, calculates the magnitude and epicenter of the earthquake, and transmits an early warning to locations outside of the initial epicentral area before the onset of the most destructive ground motions. This early warning of several seconds would be most beneficial by warning people in public places to take cover 24, deactivating electrical equipment 25, systematically shutting down pipelines 26, stopping passenger elevators 27 and trains 28, and putting industrial plants such as chemical refineries and electric power plants 29 on standby so as to safely ride out major earthquakes, thereby minimizing damage to persons and property. Additional warnings can be sent by the computer to individuals and businesses using cellular phones and phone pager networks.

Clearly from the discussion of FIGS. 1 through 3, a seismic switch located at or near the epicenter of a major earthquake will be activated before those located farther away. From the discussion of FIGS. 5a through d it is also clear that seismic switches are made to respond exclusively to the initial vertical ground motions in the epicentral area of a major earthquake. Given a record of the location and activation time of seismic switches operating in a network the epicenter and magnitude of an earthquake can be readily deduced. The location of the first activation approximates the epicenter and the geographic distribution of the subsequent activation's provide a direct measure of the epicentral area, Marcali intensity VIII and greater. Although gross, the measure provided by a network of Seismic Switches would be most useful for emergency responses immediately before and after a major earthquake.

FIGS. 9a through d show the manufacture of a Seismic Switch using photolithography. FIGS. 9a, b, c & d provide top views of the manufacturing process while FIGS. 9a',b',c' & d' provide side views of the manufacturing process.

FIGS. 9a & a' show the application of a photoresist material 31 on a substrate 32. The photoresist has been further processed to expose the two attachment points shown 32a and 32b.

FIGS. 9b & a' show the deposition of a metal layer 33 which contacts the substrate at the attachment points and buries the first photoresist layer.

FIGS. 9c & c' show a second photoresist layer 34 which has been deposited on top of the metal layer. The second photoresist layer has been further processed to mask the actual sensor and expose the metal to be removed by acid etching which removes the excess metal not covered by the resist layers FIGS. 9d & d' Etching is complete and the resist layers have been removed leaving the mass free from the substrate at the end of a flat spring. A Battery 5 and Light 6 are shown attached to the finished Seismic Switch.

FIGS. 10 Shows the Seismic Switch made by photolithography subjected to a vertical displacement d and acceleration a characteristic of the initial shock waves of a major earthquake. The inertia of the mass overcomes the spring force and the displacement is large enough to close the contacts momentarily allowing current to flow from the battery through the light.

The Seismic Switch described here embodies the observation that the vertical acceleration and displacement of the initial shock waves of an earthquake provide a reliable measure of its potential destruction. The device described here is completely insensitive to horizontal motions which eliminates much of the noise from non-earthquake vibrations and can be specifically tuned to the vertical acceleration and displacement thresholds characteristic of the P and S waves of a major earthquake. The result is a reliable sensor which detects the initial shocks of a major earthquake and activates a variety of earthquake safety applications.

The use of a unidirectional vertical threshold seismic switch to detect the initial shock of a major earthquake and activate safety devices is common to all the embodiments. Given this disclosure anyone reasonably skilled in the art would have no difficulty composing further variations on this theme. As with all disclosures of this type the foregoing is not intended to limit the scope of the invention but simply provide illustrations of the present preferred embodiments.

Accordingly, the scope of this invention should be determined by the following claims.

I claim:

1. The manufacture of a vertical, unidirectional seismic switch by micromechanical photolithography by;

a) applying a first photosensitive resist on a nonconductive substrate, exposing the resist to light through a pattern of two attachment points, and developing it to expose two attachment points on the substrate;

b) depositing a conductive layer contacting the substrate at the attachment points and burying the first resist layer;

c) applying a second photosensitive resist on the conductive layer, exposing it to a second pattern of the operating elements of the seismic switch consisting of a mass suspended over an electric contact by a flat spring, and developing the second resist to mask the operating elements of the switch;

d) acid etching the conductive layer to remove unwanted material;

e) striping away the first and second photoresist layers to free the operating elements of the seismic switch, allowing them to move in response to earthquake motions.

2. A vertical, unidirectional seismic switch to detect the initial shocks of major earthquakes and activate earthquake safety devices before the onset of destructive ground motions, comprised of;

a) a base that may be fastened to objects within, or elements of structures in contact with the earth;

b) a mass suspended above the base with a flat horizontal spring connecting the mass and base, so as to decouple the vertical motion of the mass from that of the base allowing the mass to move downward relative to the base, when the whole assembly experiences the upward accelerations and displacements characteristic of the initial shocks of a major earthquake;

c) the inertial mass, spring and damping forces of the assembly being adjusted so as to tune the spectral response of the assembly specifically to the vertical accelerations and displacements characteristic of the initial shocks of major earthquakes;

d) electric contacts on the bottom of the mass and on the base directly below the mass which are normally open and make momentary contact when the assembly experiences the upward vertical threshold accelerations and displacements characteristic of the initial shocks of a major earthquake; and e) electric means to connect the contacts on the mass and base to electromechanical earthquake safety devices.

3. An earthquake early warning alarm using a vertical, unidirectional seismic switch as recited in claim 2 to activate a solid state recording of a verbal message instructing people to take cover before the main shocks arrive.

4. An electric earthquake safety actuator using a vertical, unidirectional seismic switch as recited in claim 2 to energize an electric relay or similar logic circuit to shut off electrical equipment, activate electromechanical shut off valves on gas and liquid pipelines, alter the normal operation of automated systems such as elevators, trains, industrial process, and the like, to secure their operations in a safe standby mode before the onset of the most destructive ground motions of major earthquakes.

5. An earthquake safety actuator for elevators using a vertical, unidirectional seismic switch to energize an electric relay or similar logic circuit to alter the normal operation of an elevator as recited in claim 4, stopping the elevator at the nearest floor, opening the doors, and instructing passengers to exit the elevator using a solid state recording device to safely evacuate the elevator before the main shocks of the earthquake arrive.

6. An earthquake cabinet latch using a vertical, unidirectional seismic switch as recited in claim 2 to energize a solenoid latching cabinet doors and drawers closed, securing the contents inside and keeping objects from falling out of the cabinet during the most destructive ground motions of a major earthquake.

7. An earthquake early warning network comprised of;
 a) a multitude of vertical, unidirectional seismic switches as recited in claim 2 connected to transmitters at various locations that transmit a signal when the switch is activated by the initial shock waves of a major earthquake;
 b) a receiver that receives the multitude of remote transmissions;
 c) a computer connected to the receiver to record the time and location of the various activations;
 d) a transmitter connected to the computer that transmits the recordings made by the computer as an early warning to public and private concerns;
 e) receivers located at public and private concerns such as gas, electric, and water utilities, public transit systems, high rise buildings, and chemical refineries that desire the early warning provided by the computer recordings; and
 f) electromechanical means connected to the receivers located at public and private concerns which warn people to take cover, deactivate electrical equipment, shut off pipelines, safely stop passenger elevators and trains, and put industrial plants on standby before the onset of the destructive ground motions of a major earthquake.

8. An earthquake safety system that detects the initial shocks of major earthquakes and activates earthquake safety devices before the onset of destructive ground motions, comprised of;
 a) a vertical, unidirectional seismic switch;
 b) the activation threshold of the vertical, unidirectional seismic switch being adjusted to the vertical accelerations and displacements characteristic of the initial shocks of a major earthquake;
 c) electric means to connect the seismic switch to electromechanical earthquake safety devices;
 d) electromechanical earthquake safety devices with means to latch cabinets closed, shut off liquid and gas flow in pipelines, activate or deactivate electric circuits and equipment as appropriate, activate alarms, early warning networks, and related safety measures;
 e) means to keep the safety measures in effect until the earthquake subsides; and
 f) means to reset the safety measures after the earthquake subsides so as to be ready for another major earthquake or its after shocks.

9. An earthquake safety system as recited in claim 8 that activates an early warning alarm comprised of a solid state recording of a verbal message instructing people to take cover before the main shocks arrive.

10. An earthquake safety system as recited in claim 8 that energizes an electric relay or similar logic circuit to alter the normal operation of automated systems such as elevators, trains, industrial processes and the like to secure their operations so as to safely ride out the most destructive ground motions of a major earthquake.

11. An earthquake safety system as recited in claim 10 that alters the operation of an elevator to stop the elevator at the nearest floor, open the doors, and instruct passengers to exit the elevator using the solid state recording device so as to safely evacuate the elevator before the main shocks of the earthquake arrive.

12. An earthquake early warning network comprised of;
 a) a multitude of earthquake safety systems as recited in claim 8 connected to transmitters at various locations which transmit a signal when the switch is activated by the initial shock waves of a major earthquake;
 b) computers connected to transceivers which receive the many transmissions, record the time and location of the various activations, and transmit the time and locations of the various activations recorded as an early warning of a major earthquake in progress;
 c) receivers located at private and public concerns such as gas, electric, and water utilities, public transit systems, high rise buildings, chemical refineries, and the like; and
 d) means to warn people to take cover, deactivate electrical equipment, shut off pipelines, safely stop passenger elevators and trains, put industrial plants on standby and latch cabinets closed before the onset of destructive ground motions of a major earthquake.

* * * * *